United States Patent
Kozinski et al.

(10) Patent No.: US 10,345,514 B2
(45) Date of Patent: Jul. 9, 2019

(54) APPLIANCE AND ILLUMINATED KNOB ASSEMBLY

(71) Applicant: Haier US Appliance Solutions, Inc., Wilmington, DE (US)

(72) Inventors: Kyle Andrew Kozinski, Louisville, KY (US); Jennifer Nicole Lea, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 264 days.

(21) Appl. No.: 15/438,832

(22) Filed: Feb. 22, 2017

(65) Prior Publication Data

US 2018/0238556 A1 Aug. 23, 2018

(51) Int. Cl.
| | | |
|---|---|---|
| *F21V 8/00* | (2006.01) | |
| *F24C 3/12* | (2006.01) | |
| *F24C 7/08* | (2006.01) | |

(52) U.S. Cl.
CPC ............ *G02B 6/0096* (2013.01); *F24C 3/124* (2013.01); *F24C 3/126* (2013.01); *F24C 7/082* (2013.01)

(58) Field of Classification Search
None
See application file for complete search history.

(56) References Cited

U.S. PATENT DOCUMENTS

| | | | | | |
|---|---|---|---|---|---|
| 1,566,069 | A | * | 12/1925 | Buchholz | H03J 1/044 |
| | | | | | 116/257 |
| 2,738,758 | A | * | 3/1956 | Cutler | G05G 1/105 |
| | | | | | 116/250 |
| 2,874,268 | A | * | 2/1959 | Martin | H03J 1/044 |
| | | | | | 116/286 |
| 3,404,657 | A | * | 10/1968 | Zmuda | G05G 1/10 |
| | | | | | 116/257 |
| 3,619,594 | A | * | 11/1971 | Morez | F16D 1/06 |
| | | | | | 116/309 |
| 4,734,918 | A | * | 3/1988 | Bauer | B60H 1/00985 |
| | | | | | 116/202 |
| 4,800,466 | A | * | 1/1989 | Bauer | B60H 1/0065 |
| | | | | | 362/23.15 |
| 5,093,764 | A | * | 3/1992 | Hasegawa | G05G 1/105 |
| | | | | | 116/202 |

(Continued)

FOREIGN PATENT DOCUMENTS

| | | |
|---|---|---|
| EP | 2932344 A | 10/2015 |
| WO | WO2013122555 A2 | 8/2013 |

(Continued)

*Primary Examiner* — Avinash A Savani
*Assistant Examiner* — Martha M Becton
(74) *Attorney, Agent, or Firm* — Dority & Manning, P.A.

(57) ABSTRACT

An appliance and illuminated knob assembly are generally provided herein. The knob assembly may include a surface panel, a control knob, a light source, and a light guide. The surface panel may have a forward face and a rearward face. The control knob may be attached to the surface panel at the forward face. Moreover, the control knob may be rotatable about a central axis. The light source may be disposed behind the surface panel at the rearward face. The light guide may be removably attached to the surface panel about the control knob and include a view ring to receive a portion of light emitted from the light source.

13 Claims, 6 Drawing Sheets

(56) References Cited

U.S. PATENT DOCUMENTS

| | | | | |
|---|---|---|---|---|
| 5,697,689 A * | 12/1997 | Levine | | G05G 1/105 |
| | | | | 116/286 |
| 5,988,842 A * | 11/1999 | Johnsen | | G02B 6/0008 |
| | | | | 200/314 |
| 6,092,902 A * | 7/2000 | Weber | | G05G 1/105 |
| | | | | 362/23.17 |
| 6,176,589 B1 * | 1/2001 | Ishiguro | | H01H 19/025 |
| | | | | 362/23.01 |
| 6,224,221 B1 * | 5/2001 | Glienicke | | G02B 6/0033 |
| | | | | 116/286 |
| 6,334,688 B1 * | 1/2002 | Niwa | | G05G 1/105 |
| | | | | 362/23.01 |
| 6,733,146 B1 * | 5/2004 | Vastano | | G05G 1/105 |
| | | | | 362/23.02 |
| 6,862,482 B2 | 3/2005 | Peterson et al. | | |
| 6,876,313 B2 * | 4/2005 | Hsiung | | G05G 1/105 |
| | | | | 200/310 |
| 7,222,979 B1 * | 5/2007 | Popowich | | H01H 19/025 |
| | | | | 200/316 |
| 7,339,128 B2 * | 3/2008 | Yen | | H05B 33/0842 |
| | | | | 200/313 |
| 7,399,098 B2 * | 7/2008 | Nakamoto | | H01H 19/025 |
| | | | | 362/23.11 |
| 7,524,074 B2 * | 4/2009 | Chery | | B60K 37/06 |
| | | | | 362/23.19 |
| 7,926,964 B2 | 4/2011 | Claprood | | |
| 8,545,079 B2 * | 10/2013 | Liu | | G02B 6/4298 |
| | | | | 362/551 |
| 8,783,927 B2 | 7/2014 | Claprood | | |
| 8,876,310 B2 * | 11/2014 | Nozaki | | H01H 19/025 |
| | | | | 362/23.22 |
| 8,979,289 B2 * | 3/2015 | Camli | | F24C 7/082 |
| | | | | 362/23.09 |
| 9,146,033 B2 * | 9/2015 | Cadima | | F24C 7/082 |
| 9,459,004 B2 * | 10/2016 | Bach | | F21V 33/0044 |
| 9,459,011 B2 * | 10/2016 | Bach | | F24C 7/083 |
| 9,462,683 B2 * | 10/2016 | Bach | | H05K 1/0274 |
| 9,663,891 B2 * | 5/2017 | Park | | F21V 33/0044 |
| 9,835,789 B2 * | 12/2017 | Arceo | | G02B 6/0068 |
| 10,139,852 B2 * | 11/2018 | Crosby | | G05G 1/54 |
| 2002/0075668 A1 * | 6/2002 | Dorrie | | H01H 19/025 |
| | | | | 362/23.04 |
| 2003/0112160 A1 * | 6/2003 | Hsiung | | G05G 1/105 |
| | | | | 341/31 |
| 2005/0067268 A1 * | 3/2005 | Hurrle | | H01H 9/161 |
| | | | | 200/314 |
| 2006/0219156 A1 * | 10/2006 | Denton | | G05G 1/105 |
| | | | | 116/310 |
| 2007/0193867 A1 * | 8/2007 | Lorenzo Riera | | H01H 13/023 |
| | | | | 200/314 |
| 2007/0253185 A1 * | 11/2007 | Palacio | | G01D 11/28 |
| | | | | 362/97.1 |
| 2011/0297664 A1 | 12/2011 | Fukui | | |
| 2012/0243253 A1 * | 9/2012 | Claprood | | F24C 7/082 |
| | | | | 362/555 |
| 2014/0047944 A1 | 2/2014 | Camli et al. | | |
| 2014/0056022 A1 * | 2/2014 | Camli | | F24C 7/082 |
| | | | | 362/551 |
| 2014/0260775 A1 * | 9/2014 | Freeman | | G05G 1/08 |
| | | | | 74/553 |
| 2018/0232001 A1 * | 8/2018 | Gur | | F24C 7/082 |
| 2018/0245795 A1 * | 8/2018 | Serabatir | | F24C 3/124 |

FOREIGN PATENT DOCUMENTS

| | | |
|---|---|---|
| WO | WO2014090511 A1 | 6/2014 |
| WO | WO2015003730 A1 | 1/2015 |
| WO | WO2016014007 A1 | 1/2016 |

* cited by examiner

APPLIANCE AND ILLUMINATED KNOB ASSEMBLY

FIELD OF THE INVENTION

The present subject matter relates generally to control knobs on an appliance, such as a cooking appliance. More particularly, the present subject matter relates to an improved assembly for illuminating control knobs.

BACKGROUND OF THE INVENTION

Knobs are commonly used on a variety of commercial and residential appliances to control an operating condition of the appliance. Knobs are particularly common on cooking appliances, such as stoves or cooktops. Various shapes and sizes can be used depending upon e.g., the intended application, aesthetics, and other factors.

For example, cooking appliances that include a cooktop traditionally have at least one heating element positioned on a panel proximate a cooktop surface for use in heating or cooking an object, such as a cooking utensil, and its contents. The heating element can operate to heat a cooking utensil directly through induction heating, or may use another heat source such as electrically resistant coils or gas burners. In turn, some cooktops have lighting elements installed beneath or behind the knobs so that the light may shine through an opening. One or more light guides may be provided around the knob to display the light above or in front of the panel and communicate certain conditions to the user, such as e.g., whether the knob is in an "on" position. When assembled, the light guide is installed with the rest of the knob and secured to the panel from a position behind the panel and, e.g., enclosed within the appliance.

Certain challenges exist with this construction, however. Generally, existing constructions make it impossible to attach or remove the light guide once the panel is assembled. Specifically, disassembly and/or removal of the panel from the cooktop appliance may be required to detach an existing light guide. However, such detachment may be desired in order to, for example, clean the surrounding area or replace the existing light guide with a new light guide that provides a distinct, unique appearance.

Accordingly, an improved control knob assembly, such as a knob assembly that uses light to indicate operation of the control knob, would be beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a knob assembly is provided. The knob assembly may include a surface panel, a control knob, a light source, and a light guide. The surface panel may have a forward face and a rearward face. The surface panel may define a light opening extending through the surface panel from the rearward face to the forward face. The control knob may be attached to the surface panel at the forward face. Moreover, the control knob may be rotatable about a central axis. The light source may be disposed behind the surface panel at the rearward face. The light guide may be removably attached to the surface panel about the control knob. The light guide may include a view ring to receive a portion of light emitted from the light source. The light guide may further include a resilient tab extending from the view ring to retain the resilient tab. Moreover, the resilient tab may be biased radially outward away from the central axis.

In another aspect of the present disclosure, a knob assembly is provided. The knob assembly may include a surface panel, a control board, an input stem, and a coupling nut, and a control knob. The surface panel may have a forward face and a rearward face. The surface panel may define a stem opening extending through the surface panel from the rearward face to the forward face along a central axis. The control board may be disposed behind the surface panel at the rearward face. The input stem may extend from the control board to a distal end through the stem opening. Moreover, the input stem may include a fixed coupling sleeve. The coupling nut may be secured to the coupling sleeve at the forward face and restrict rearward movement of the input stem though the central axis. The control knob may be rotatably fixed to the input stem at the distal end.

In yet another aspect of the present disclosure, a cooking appliance is provided. The cooking appliance may include a heating element, a control knob to control the heating element, a surface panel supporting the control knob, a light source disposed behind the surface panel, a light guide removably attached to the surface panel, a control board, an input stem, and a coupling nut. The surface panel may include a forward face and a rearward face. The surface panel may define a light opening and a stem opening. The light opening and the stem opening may extend through the surface panel from the rearward face to the forward face. The light guide may be removably attached about the control knob and include a view ring to receive a portion of light emitted from the light source. The light guide may further include a resilient tab extending from the view ring to retain the resilient tab. The resilient tab may be biased radially outward away from a central axis. The control board may be disposed within the cooking appliance behind the surface panel at the rearward face. The input stem may extend from the control board to the control knob through the stem opening. The input stem may include a fixed coupling sleeve. The coupling nut may be secured to the coupling sleeve at the forward face and restrict rearward movement of the input stem though the central axis, while the control knob may be rotatably fixed to the input stem.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
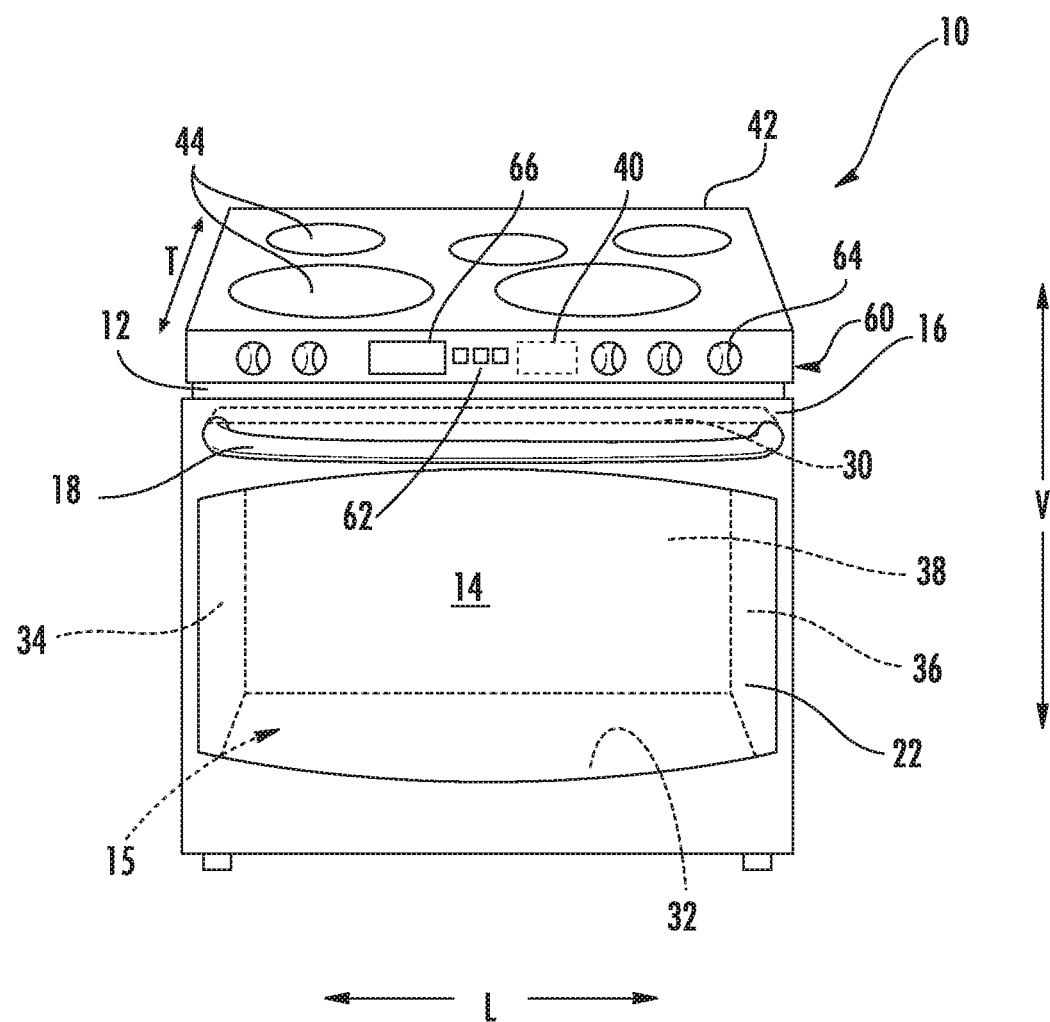
FIG. 1 provides a front perspective view of an oven appliance according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, some aspects of the present disclosure provide a control knob that is mounted to a surface panel of a cooking appliance. A light source may be disposed or mounted behind the surface panel to shine a light through the surface panel and around the control knob. A light guide may be removably attached to the surface panel around the control knob. Additionally or alternatively, a control board may be positioned behind the surface panel and secured to the surface panel by an input stem and coupling nut. When assembled, the input stem may extend through the surface panel while the coupling nut attaches around the input stem at the front of the surface panel.

Turning now to the figures, FIG. 1 provides a perspective view of a cooking appliance, such as an oven appliance 10, according to example embodiments of the present subject matter. Oven appliance 10 defines a vertical direction V, a lateral direction L, and a transverse direction T. The vertical direction V, lateral direction L, and transverse direction T are mutually perpendicular and form an orthogonal direction system. As will be understood, oven appliance 10 is provided by way of example only, and the present subject matter may be used in any suitable oven appliance. Thus, the present disclosure may be used with other oven, range, or cooktop appliance configurations (e.g., configurations that define multiple interior cavities for the receipt of food, include no interior cavities, or are otherwise different than the configuration shown in FIG. 1).

Oven appliance 10 includes an insulated cabinet 12 with an interior cooking chamber 14 defined by an interior surface 15 of cabinet 12. Cooking chamber 14 is configured for the receipt of one or more food items to be cooked. Oven appliance 10 includes a door 16 rotatably mounted to cabinet 12, e.g., with a hinge (not shown). A handle 18 is mounted to door 16 and assists a user with opening and closing door 16 in order to access an opening to cooking chamber 14. For example, a user can pull on handle 18 to open or close door 16 and access cooking chamber 14 through the opening.

Oven appliance 10 can includes a seal (not shown) between door 16 and cabinet 12 that assist with maintaining heat and cooking fumes within cooking chamber 14 when door 16 is closed, as shown in FIG. 1. One or more parallel glass panes 22 provide for viewing the contents of cooking chamber 14 when door 16 is closed and assist with insulating cooking chamber 14. Optionally, a baking rack (not pictured) is positioned in cooking chamber 14 for the receipt of food items or utensils containing food items.

As shown, various sidewalls define cooking chamber 14. For example, cooking chamber 14 includes a top wall 30 and a bottom wall 32 which are spaced apart along the vertical direction V. Left sidewall 34 and right sidewall 36 (as defined according to a front view as shown in FIG. 1) extend between the top wall 30 and bottom wall 32, and are spaced apart along the lateral direction L. A rear wall 38 additionally extends between the top wall 30 and bottom wall 32 as well as between the left sidewall 34 and right sidewall 36, and is spaced apart from the door 16 along the transverse direction T. Cooking chamber 14 is thus defined between the top wall 30, bottom wall 32, left sidewall 34, right sidewall 36, and rear wall 38.

In some embodiments, oven appliance 10 a cooktop surface 42 having one or more heating elements 44 for use in, e.g., heating or cooking operations. In example embodiments, cooktop surface 42 is comprised of ceramic glass. In other embodiments, however, cooktop surface 42 may be comprised of another suitable material, such as a metallic material (e.g., steel) or another suitable non-metallic material. Heating elements 44 may be various sizes, as shown in FIG. 1, and may employ any suitable method for heating or cooking an object, such as a cooking utensil (not shown), and its contents. In one embodiment, for example, heating element uses a heat transfer method, such as electric coils or gas burners, to heat the cooking utensil. In another embodiment, however, heating element 44 uses an induction heating method to heat the cooking utensil directly. In turn, heating element may include a burner element, electric heat element, induction element, or another suitable heating element.

In turn, some embodiments of oven appliance 10 include a controller 40, e.g., configured to control one or more operations of oven appliance 10. For example, controller 40 may control at least one operation of oven appliance 10 that includes an internal heating element or cooktop heating element 44. Controller 40 may be in communication (via for example a suitable wired or wireless connection) with one or more of heating element(s) 44 and other suitable components of oven appliance 10, as discussed herein. In general, controller 40 may be operable to configure oven appliance 10 (and various components thereof) for cooking. Such configuration may be based, for instance, on a plurality of cooking factors of a selected operating cycle or mode.

By way of example, controller 40 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 40 may be positioned in a variety of locations throughout oven appliance 10. As illustrated, controller 40 may be located within a user interface 62 of oven appliance 10. In some such embodiments, input/output ("I/O") signals may be routed between controller 40 and various operational components of oven appliance 10, such as heating element(s) 44, control knobs 64, display component 66, sensors, alarms, and/or other components as may be provided.

For instance, signals may be directed along one or more wiring harnesses that may be routed through cabinet 12. In some embodiments, controller 40 is in communication with user interface assembly 62 and control knobs 64 through which a user may select various operational features and modes and monitor progress of oven appliance 10. In one embodiment, user interface assembly 62 may represent a general purpose I/O ("GPIO") device or functional block. In one embodiment, user interface assembly 62 may include input components, such as one or more of a variety of electrical, mechanical or electro-mechanical input devices including rotary dials, push buttons, and touch pads. User interface assembly 62 may include a display component 66, such as a digital or analog display configured to provide operational feedback to a user.

During use of oven appliance 10, the amount of heat delivered by each heating element 44 on cooktop 42 may be controlled by controller 40 and a corresponding knob assembly 60, described in detail below. For instance, knob assembly 60 may include one or more control knobs 64. Each control knob 64 may correspond to a discrete heating element 44. Control knob 64, as used herein, refers to any configuration of dial, and not just one having a circular base shape. For example, the present disclosure contemplates example embodiments wherein control knobs 64 have a rectangular base shape, an ovular base shape, or any other shape having one or more curved lines, straight lines, or both.

Figure 2:
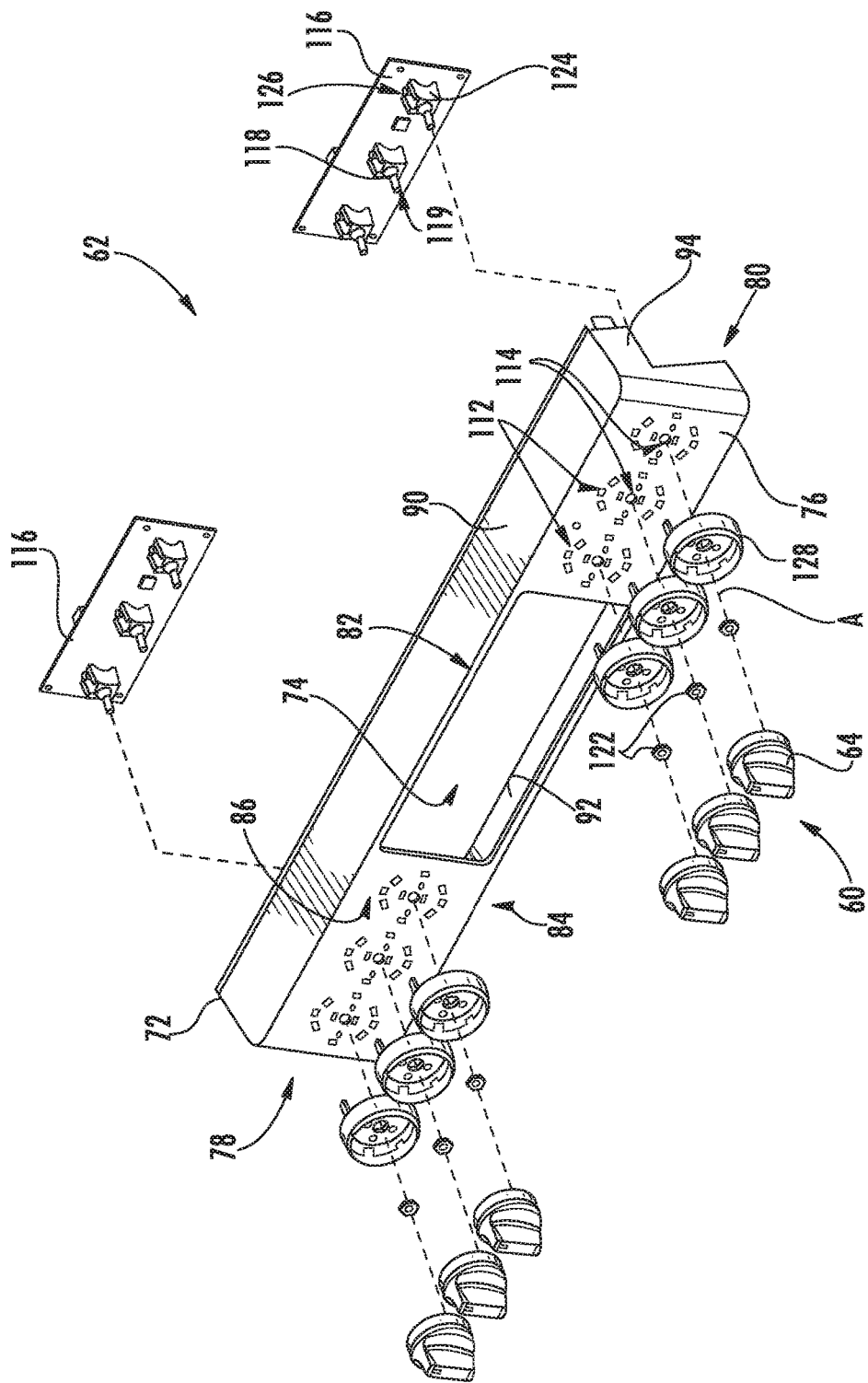
FIG. 2 provides an exploded perspective view of the user interface assembly of the example oven appliance of FIG. 1.
Figure 3:
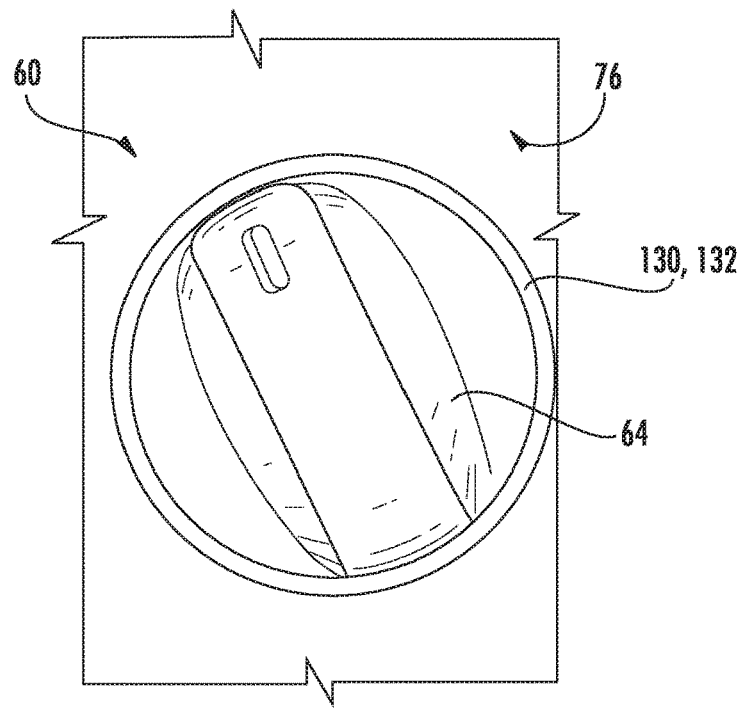
FIG. 3 provides a front view of a knob assembly according to example embodiments of the present disclosure.
Figure 4:
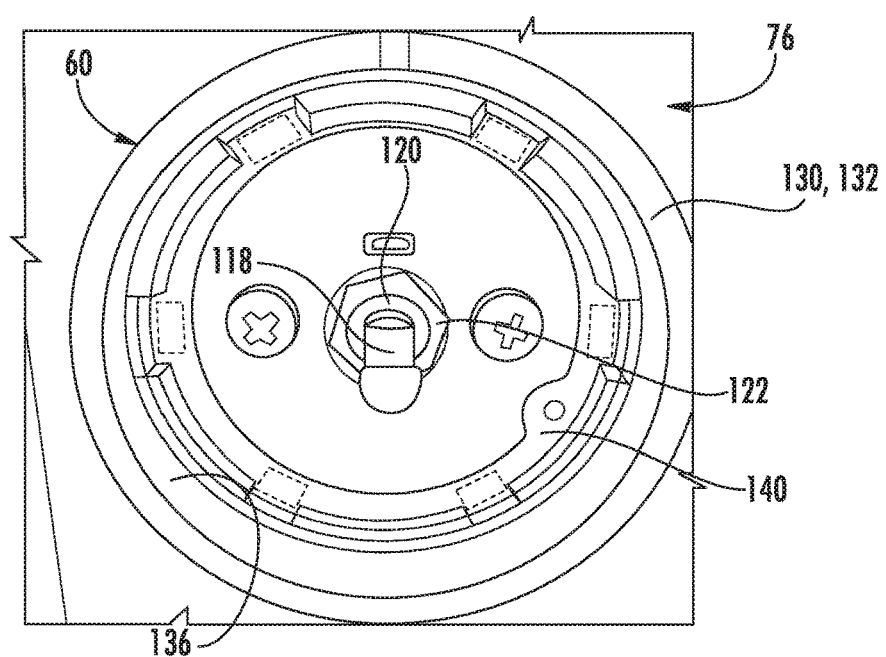
FIG. 4 provides a front few of a portion of the knob assembly of FIG. 3, wherein the knob has been removed.
Figure 5:
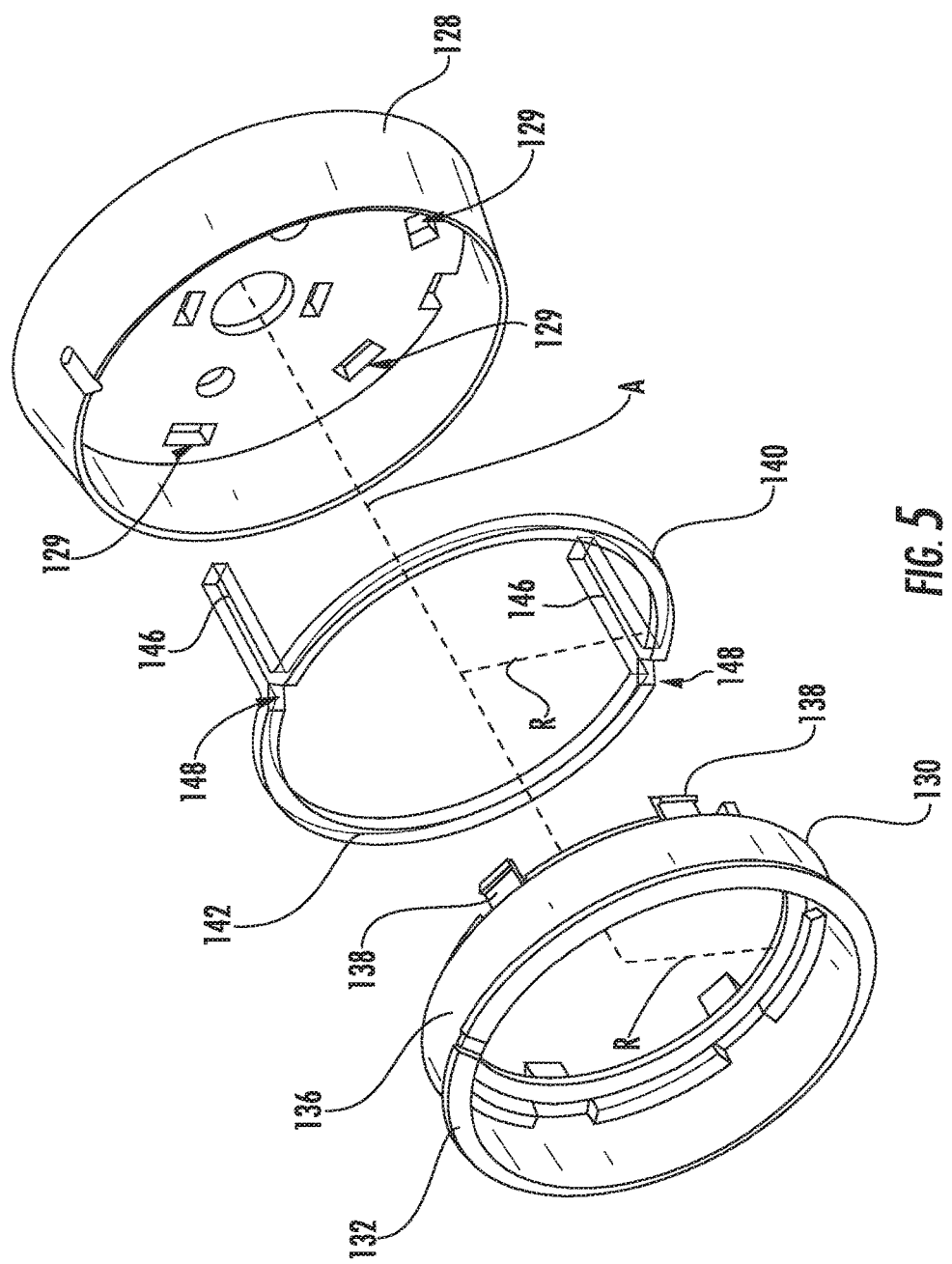
FIG. 5 provides an exploded perspective view of a portion of the example knob assembly of FIG. 3.
Figure 6:
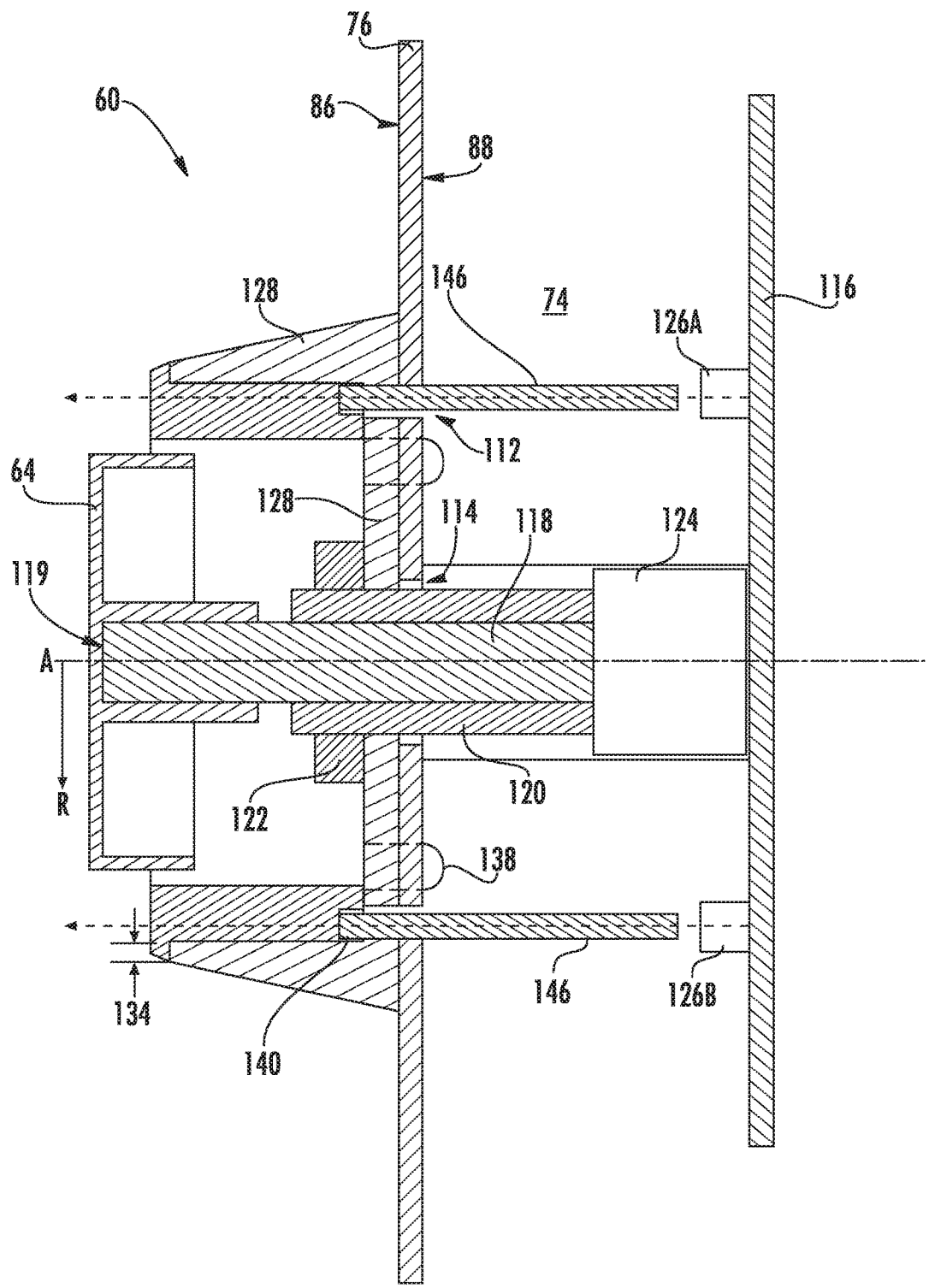
FIG. 6 provides a schematic side view of the example knob assembly of FIG. 3.
Figure 7:
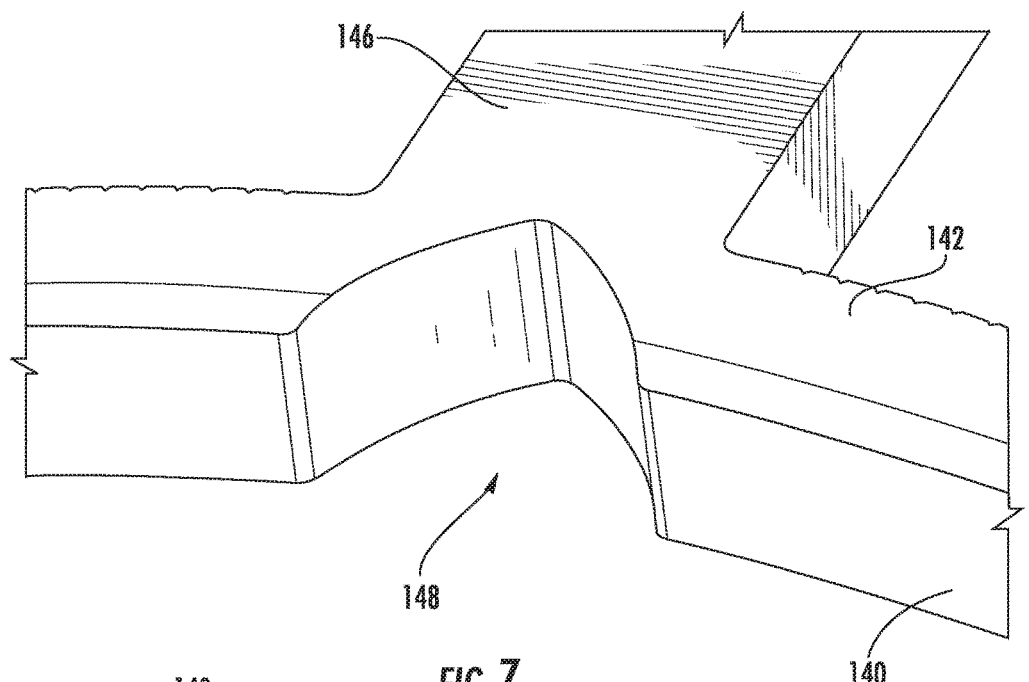
FIG. 7 provides a magnified perspective view of a front portion of the second light guide of the example knob assembly of FIG. 4.
Figure 8:
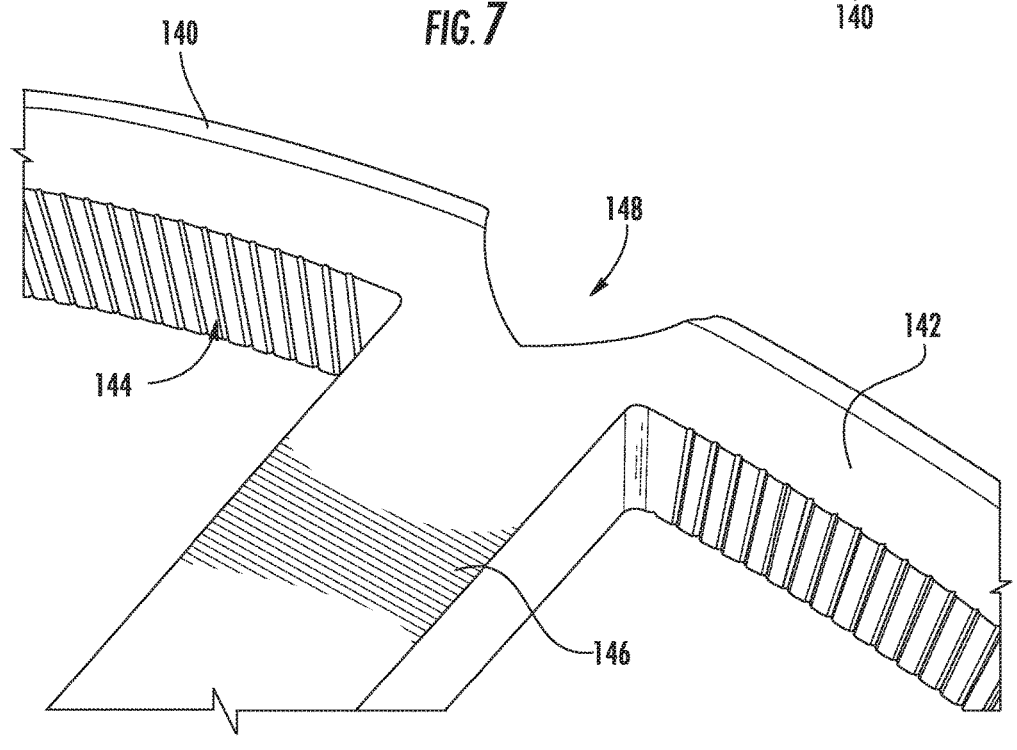
FIG. 8 provides a magnified perspective rear of a front portion of the second light guide of the example knob assembly of FIG. 4.

Turning now to FIGS. 2 through 6, FIG. 2 provides an exploded perspective view of a user interface assembly 62, which may be assembled on a front portion of appliance 10 (e.g., forward of cooktop 42 along the transverse direction T), as shown in FIG. 1. FIGS. 3 and 4 provide a front view of a knob assembly 60 of user interface assembly 62. FIGS. 3 and 4 provide view both with a control knob 64 attached to user interface assembly 62 (FIG. 3) and without control knob 64 attached to user interface assembly 62 (FIG. 4). FIG. 5 provides an exploded view of several elements of knob assembly 60. FIG. 6 provides a schematic view of knob assembly 60 attached to user interface assembly 62.

As shown in FIG. 2, user interface assembly 62 may include a trim portion 72 to be attached on the front portion of cabinet 12 (See FIG. 1). Alternatively, trim portion 72 may be mounted rearward and/or above cooktop 42, e.g., at a backsplash. Trim portion 72 generally defines a rear cavity 74 to be mated against cabinet 12 (FIG. 1). In example embodiments, trim portion 72 includes a surface panel 76 extending between a left end 78 and a right end 80, as well as between a top portion 82 and a bottom portion 84. Surface panel 76 may thus be provided as a planar support member. It is understood that the identified left and right ends 78, 80 may generally correspond to a front-facing orientation of a user in relation to appliance 10 (FIG. 1).

When assembled, an opposing forward face 86 and rearward face 88 of surface panel 76 may extend, e.g., in parallel, between left end 78 and a right end 80, as well as between top portion 82 and a bottom portion 84. As shown, forward face 86 is directed outward or away from rear cavity 74, while rearward face 88 is directed inward or toward rear cavity 74. An upper panel 90 may extend across the top portion 82 of surface panel 76 (e.g., between the two opposing left and right ends 78, 80) and rearward from surface panel 76 to define a portion of rear cavity 74. A lower panel 92 may extend across the bottom portion 84 of surface panel 76 and rearward from surface panel 76 to define a portion of rear cavity 74. Moreover, one or more side panels 94 may extend rearward from surface panel 76, e.g., at the left and right ends 78, 80 to further define a portion of rear cavity 74.

Generally, surface panel 76 defines one or more openings extending therethrough. In some embodiments, a light opening 112 is defined through surface panel 76, e.g., from rearward face 88 to forward face 86. Optionally, multiple discrete light openings 112 may be provided. Each light opening 112 may be defined as a parallel opening to the other light openings 112. In certain embodiments, a stem opening 114 is further defined through surface panel 76 from rearward face 88 to forward face 86. For instance, stem opening 114 may be defined through surface panel 76 along an input axis A. In turn, surface panel 76 may generally extend along a radial direction R, perpendicular to input axis A. In embodiments wherein multiple discrete light openings 112 are defined, two or more of light openings 112 may be positioned or defined at discrete circumferential locations about the input axis A and/or stem opening 114. Further embodiments may include multiple stem openings and multiple light openings defined at discrete circumferential locations about a different corresponding input axis and/or light opening. Although several unique input axes and corresponding light openings may be provided, it is understood that each may be mutually parallel and, for example, perpendicular to surface panel 76.

One or more control knobs 64 are attached to surface panel 76. Specifically, a control knob 64 is attached to surface panel 76 at the forward face 86. Thus, control knob 64 is positioned on the opposite side of surface panel 76 from rear cavity 74. When assembled, control knob 64 may be configured to rotate about input axis A. If a plurality of control knobs 64 is included, it is understood that each control knob 64 may rotate about a unique input axis A.

In some embodiments, a control board 116 is disposed behind (e.g., rearward relative to the input axis A) surface panel 76. Specifically, control board 116 may be disposed at the rearward face 88. When assembled, control board 116 may be mounted within rear cavity 74. Control knob 64 may communicate with control board 116 such that rotation of control knob 64 is detected at control board 116. For instance, an input stem 118 may mechanically connect control board 116 to control knob 64. In some such embodiments, input stem 118 protrudes from control board 116, e.g., at the rearward face 88 of surface panel 76. From control board 116, input stem 118 may extend, e.g., linearly along input axis A, to a distal end 119. Distal end 119 may engage or be received by control knob 64, e.g., at the forward face 86. Thus, input stem 118 may extend through surface panel 76, and specifically through the stem opening 114. Optionally, a fixed coupling sleeve 120 may be provided with input stem 118, e.g., from surface panel 76 to a position behind distal end 119 at the forward face 86. Fixed coupling sleeve 120 may be secured to control board 116 and coaxial with input stem 118. When assembled, input stem 118 may thus rotate about input axis A within fixed coupling sleeve 120 while control board 116 and fixed coupling sleeve 120 remain stationary. A coupling mechanism or coupler 122, such as a rotatable nut or clip, may be mated to input stem 118 and/or fixed coupling sleeve 120 at the forward face 86. When mated, coupler 122 may bias an upper portion of input stem 118 towards the forward face 86 while control board 116 is biased towards the rearward face 88. Input stem 118 may thus be secured between forward face 86 and rearward face 88.

Moreover, control board 116 may be in operable communication, or formed as part of, controller 40. Thus, rotation of control knob 64 may affect appliance operation, e.g., at heating element 44 (FIG. 1), as described above. In some embodiments, a potentiometer 124 is included on control board 116 and attached to input stem 118. Specifically, input stem 118 may be operably attached to potentiometer 124 such that a portion of input stem 118 rotates therein. Potentiometer 124 is generally understood to act a variable resistor. A voltage through potentiometer 124, e.g., to be delivered to heating element 44, may be determined by the position of input stem 118. During use, rotation of control knob 64 and input stem 118 may thus alternately increase or decrease voltage through potentiometer 124. In turn, rotation of rotation of control knob 64 and input stem 118 may thus alternately increase or decrease an output of heating element 44.

As shown, one or more light sources 126 are provided to emit or direct a light through surface panel 76 to the forward face 86. Thus a light source 126 is disposed behind surface panel 76 at the rearward face 88. Light source 126 may be fixed relative to potentiometer 124 and/or input axis A. In optional embodiments, light source 126 is mounted on control board 116. In further embodiments, multiple light sources 126 are circumferentially positioned about input axis A. For instance, a first light source 126A may be positioned at a first circumferential position while a second light source 126B is spaced apart from first light source 126A at a second circumferential position.

In some embodiments, a modular bezel body 128 is removably attached to surface panel 76. Specifically, modular bezel body 128 may be attached to surface panel 76 at the forward face 86. When assembled, bezel body 128 may be disposed about input stem 118 and/or input axis A. In some such embodiments, fixed sleeve extends through bezel body 128 while coupler 122 holds bezel body 128 to forward face 86. In turn, bezel body 128 may be positioned between coupler 122 and forward face 86, e.g., along the input axis A. Additionally or alternatively, one or more suitable adhesives or mechanical connectors, such as screws, bolts, or clips, may join modular bezel body 128 to surface panel 76.

Turning specifically to FIGS. 3 through 6, certain embodiments of knob assembly 60 include a light guide, e.g., first light guide 130, that is removably attached to surface panel 76. When assembled, first light guide 130 may be generally positioned about control knob 64 at forward face 86. First light guide 130 may include, for instance, a transparent or translucent view ring 132 as well as a support body 136. In optional embodiments, support body 136 is disposed within bezel body 128 and extends axially rearward (e.g., rearward along the input axis A) from view ring 132 toward surface panel 76. Thus, bezel body 128 may be disposed about first light guide 130. Generally, view ring 132 is included to receive a portion of light emitted from light source 126. During operations, at least a portion of light from light source 126 may thus be visible at forward face 86, e.g., by user to indicate activation of heating element 44. Optionally, view ring 132 may be positioned axially forward of bezel body 128. In some embodiments, an outer lip 134 extends radially outward (i.e., outward along the radial direction R) from view ring 132. Specifically, outer lip 134 extends over modular bezel body 128 to display a portion of a light transmission from light source 126.

As shown, some embodiments of first light guide 130 include one or more resilient tabs 136. Resilient tab 138 extends axially rearward from view ring 132 and support body 136 toward bezel body 128. Moreover, resilient tab 138 may be biased radially outward from input axis A. In other words, resilient tab 138 may be biased outward along the radial direction R away from input axis A. When assembled, resilient tab 138 may be received by a snap opening 129 defined within or through bezel body 128. An expanded portion of resilient tab 138 may be held behind snap opening 129 along (e.g., parallel to) the input axis A to restrict forward movement of first light guide 130, e.g., away from surface panel 76. Thus, the bias of resilient tab 138 may hold first light guide 130 at a specific position relative to bezel body 128. Optionally, a plurality of resilient tabs 136 may be included, each resilient tab 138 being located at a discrete circumferential position along support body 136. In such embodiments, bezel body 128 defines a plurality of snap openings 129 corresponding to the plurality of resilient tabs 136. A separate tool (not pictured) may be inserted into snap opening 129 to motivate resilient tab 138 (including expanded portion) radially inward, thereby allowing resilient tab 138 to pass from snap opening 129. Advantageously, snap openings 129 and resilient tabs 136 may be accessible from a front portion of appliance 10 (FIG. 1), e.g., at the forward face 86, thereby allowing convenient access and/or removal of first light guide 130.

In certain embodiments, first light guide 130 is formed as a tinted body. For instance, a dye or coating of first light guide 130 may be applied to absorb a predetermined spectrum or wavelength of light. In other words, first light guide 130 may be formed to display one or more specific colors. Thus, first light guide 130 may be configured to transmit a limited spectrum of light. One or more additional replacement first light guides 130 may be provided in some embodiments. In turn, first light guide 130 may be easily and readily replaced. For instance, one first light guide that is not tinted may be replaced with another first light guide that is tinted to display another color, such as red, in order to selectively illuminate with a desired color during use.

A second light guide 140 is further attached to surface panel 76 in some embodiments. As shown, second light guide 140 may be positioned between first light guide 130 and forward face 86 (e.g., in front of bezel body 128). Moreover, second light guide 140 is formed as a substantially transparent or translucent member. When assembled, second light guide 140 is aligned with first light guide 130 to direct light emissions thereto. For instance, second light guide 140 may be positioned about input axis A and coaxial with first light guide 130. In certain embodiments, second light guide 140 includes a guiding ring segment 142. Additionally, guiding ring 142 may be circumferentially positioned about support body 136. Guiding ring 142 may be further positioned axially rearward from view ring 132 and/or within bezel body 128. Outer lip 134 may extend over guiding ring 142 in the radial direction R. In some embodiments, a plurality of light refracting ridges 144 is formed on guiding ring 142. For instance, light refracting ridges 144 may be formed on a rearward-facing surface of guiding ring 142. Moreover, the plurality of light refracting ridges may be formed at discrete circumferential locations along guiding ring 142 and generally diffuse light transmitted through second light guide 140.

As shown in FIGS. 3 through 8, some embodiments of second light guide 140 include one or more leading legs 146. When assembled, leading leg(s) 146 extend axially (e.g., parallel to input axis A) and rearward from guiding ring 142. Specifically, each leading leg 146 extends through surface panel 76 and/or bezel body 128 toward light source 126. Optionally, each leading leg 146 of a plurality of leading legs 146 may correspond to a discrete light source 126. During use, light emissions may be directed through leading leg 146 to guiding ring 142.

In additional or alternative embodiments, a primary refractor 148 is provided on second light guide 140. As shown, primary refractor 148 is formed as one or more angled surfaces at a forward facing surface of guiding ring 142 to separate and redirect light emission through guiding ring 142. When assembled, primary refractor 148 may be in optical communication with light source 126. For instance, a primary refractor 148 may be circumferentially aligned with a leading leg 146. Light transmitted through leading leg 146 may thus be refracted and/or diffused circumferentially about guiding ring 142 before being transmitted to first light guide 130.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A knob assembly for an appliance, the knob assembly comprising:
    a surface panel having a forward face and a rearward face, the surface panel defining a light opening extending through the surface panel from the rearward face to the forward face;
    a control knob attached to the surface panel at the forward face, the control knob being rotatable about a central axis;
    a light source disposed behind the surface panel at the rearward face;
    a modular bezel body disposed on the forward face; and
    a light guide removably attached to the surface panel about the control knob, the light guide comprising a view ring to receive a portion of light emitted from the light source, the light guide further comprising a resilient tab extending axially rearward from the view ring to retain the light guide and modular bezel body at a specific fixed position relative to the surface panel, the resilient tab being biased radially to deflect perpendicular to the central axis,
    wherein the modular bezel body is disposed concentrically about the light guide.

2. The knob assembly of claim 1, wherein the light guide is a first light guide, and wherein the knob assembly further comprises a second light guide attached to the surface panel and positioned between the first light guide and the forward face, the second light guide being aligned with the first light guide to direct a light emission thereto.

3. The knob assembly of claim 2, wherein the second light guide comprises a leading leg extending through the surface panel to the light source.

4. The knob assembly of claim 2, wherein the second light guide comprises a primary refractor in optical communication with the light source.

5. The knob assembly of claim 2, wherein the second light guide comprises a guiding ring and a plurality of light-refracting ridges formed on the guiding ring.

6. The knob assembly of claim 1, wherein the light guide comprises an outer lip extending radially outward over the modular bezel body to display a portion of a light transmission from the light source.

7. The knob assembly of claim 1, wherein light guide comprises a tinted body configured to transmit a limited spectrum of light.

8. The knob assembly of claim 1, further comprising
    a control board positioned at the rearward face of the surface panel; and
    an input stem extending along the central axis through the surface panel from control board and above the forward face.

9. The knob assembly of claim 8, wherein the light source is mounted on the control board.

10. A cooking appliance comprising:
    a heating element mounted to the cooking appliance;
    a control knob attached to the cooking appliance to control the heating element, the control knob defining a central axis;
    a surface panel supporting the control knob, the surface panel comprising a forward face and a rearward face, the surface panel defining a light opening and a stem opening, the light opening and the stem opening extending through the surface panel from the rearward face to the forward face;
    a light source disposed within the cooking appliance behind the surface panel;
    a modular bezel body disposed on the forward face;
    a light guide removably attached to the surface panel about the control knob, the light guide comprising a view ring to receive a portion of light emitted from the light source, the light guide further comprising a resilient tab extending axially rearward from the view ring to retain the light guide and the modular bezel body at a fixed specific position relative to the modular bezel body, the resilient tab being biased radially to deflect perpendicular to the central axis;
    a control board disposed within the cooking appliance behind the surface panel at the rearward face;
    an input stem extending from the control board to the control knob through the stem opening, the input stem comprising a fixed coupling sleeve; and
    a coupling nut secured to the coupling sleeve at the forward face and restricting rearward movement of the input stem though the central axis, the control knob being rotatably fixed to the input stem,
    wherein the modular bezel body is disposed concentrically about the light guide.

11. The cooking appliance of claim 10, wherein the light guide comprises an outer lip extending radially outward over the modular bezel body to display a portion of a light transmission from the light source, and wherein the light guide comprises a resilient tab extending from the view ring toward the modular bezel body, the resilient tab being biased radially outward away from the central axis, and wherein the modular bezel body defines a snap opening to receive the resilient tab.

12. The knob assembly of claim 10, further comprising a potentiometer operably attached to the input stem on the control board.

13. The cooking appliance of claim 10, wherein the light guide is a first light guide, and wherein the knob assembly further comprises a second light guide attached to the surface panel and positioned between the first light guide and the forward face, the second light guide being aligned with the first light guide to direct a light emission thereto.

* * * * *